FRED D. LITTY
INVENTOR.

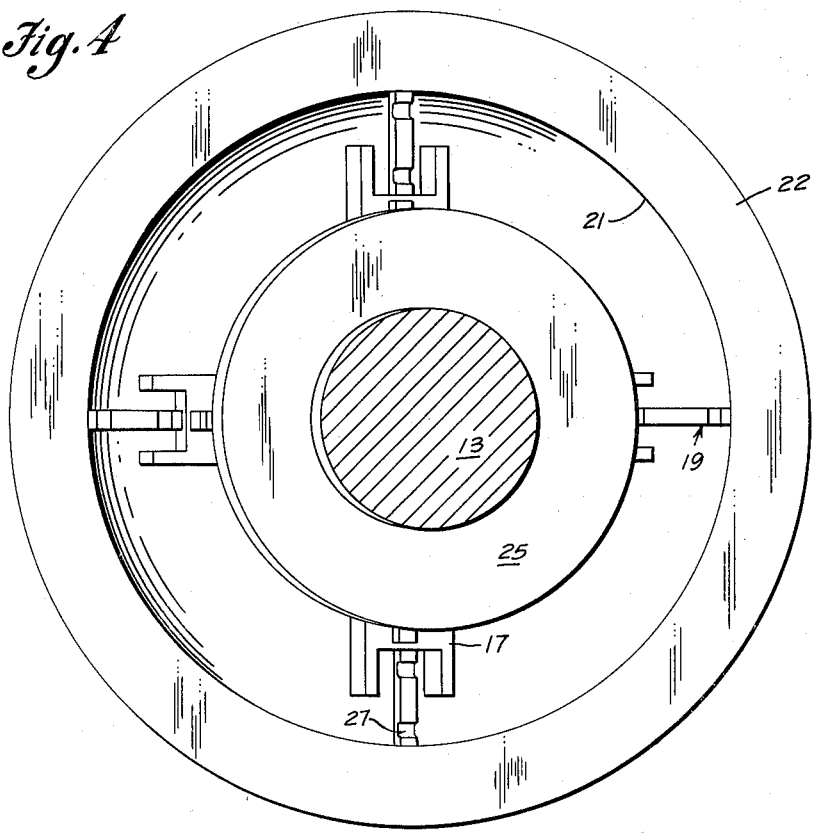
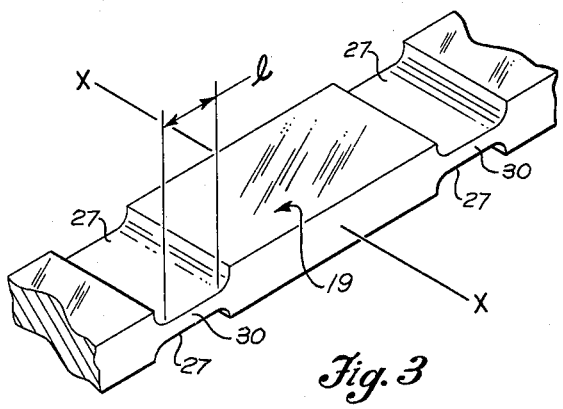

United States Patent Office 3,211,011
Patented Oct. 12, 1965

3,211,011
INERTIAL COMPENSATION MECHANISM FOR FLEXURE SPRING SUSPENDED GYRO
Fred D. Litty, Towaco, N.J., assignor to General Precision Inc., Little Falls, N.J., a corporation of Delaware
Filed Aug. 7, 1961, Ser. No. 131,461
9 Claims. (Cl. 74—5)

This invention relates to gyroscopic instruments, and more particularly to a gyroscopic instrument of the type having a spinning mass or wheel supported on a driving shaft by means of a flexible stem. Gyroscopic devices of this type are described and claimed in U.S. Patent No. 3,077,785 issued on copending application Serial No. 838,979 filed September 9, 1959, and assigned to the same assignee as the present invention.

In this form of gyroscopic instrument, the flexible stem or joint, permits universal pivoting or deflecting of the wheel axis with respect to the shaft axis. When the wheel is deflected so that its axis is not colinear with the shaft axis, the flexible joint will exert a restoring torque on the wheel tending to pivot it back to the normal position, in which the axis of the wheel is colinear with the axis of the driving shaft. This torque will tend to rotate the axis of the wheel, and therefore will cause precessional errors in the gyroscopic instrument if it is not cancelled out by a compensating torque in the opposite direction. The purpose of the present invention is to provide a compensating torque cancelling out the torque exerted by the flexible joint.

Prior to the present invention a circular magnetic assembly was used to compensate for the torque exerted by the flexible joint. This magnetic assembly is bulky, is very non-linear, and does not have good over-all stability.

In the system of the present invention the compensation is provided entirely mechanically by a plurality of small blocks equally spaced in a plane normal to the spin axis and containing the pivot point about which the wheel is pivotable with respect to the shaft. Each of these blocks is supported by a respective small, light-weight arm extending radially between the block and the rim of the wheel and a small, light-weight column extending axially between the block and a coaxial disc fixed to the drive shaft.

When the drive shaft is rotated at a high constant speed, the blocks generate a centrifugal force directed outwardly along the radially extending support arms. When the wheel is deflected, a component of the centrifugal force applies a torque to the wheel in such a direction as to increase the deflection. Thus the blocks apply a torque to the wheel tending to pivot it in the direction that it is deflected from its normal position, or in other words in the opposite direction to that applied by the flexible stem. This torque is very linear with respect to the angle of deflection of the wheel at small angles of deflection. The torque exerted by the flexible stem is also linear with respect to the angle of deflection and therefore the masses of the blocks can be selected so that the compensating torque applied to the wheel precisely cancels out the torque applied to the wheel by the flexible stem. The system is extremely stable and is of negligible weight.

Accordingly an object of the present invention is to provide a highly linear compensation system in a gyroscopic instrument of the type in which the wheel is supported by a flexible joint.

Another object of the invention is to provide a compensation system of the type described which is extremely stable, of negligible weight, and entirely mechanical in its operation.

Further objects and advantages of the present invention will become readily apparent as the following detailed description of a preferred embodiment of the invention unfolds and when taken in conjunction with the drawings, wherein:

FIG. 3 illustrates one of the radial support arms in detail; and

FIG. 4 is a bottom plan view of the wheel shown in FIG. 1, showing the relation of the blocks and the radial arms to one another, taken on the line 4—4 of FIG. 1.

Figure 1:
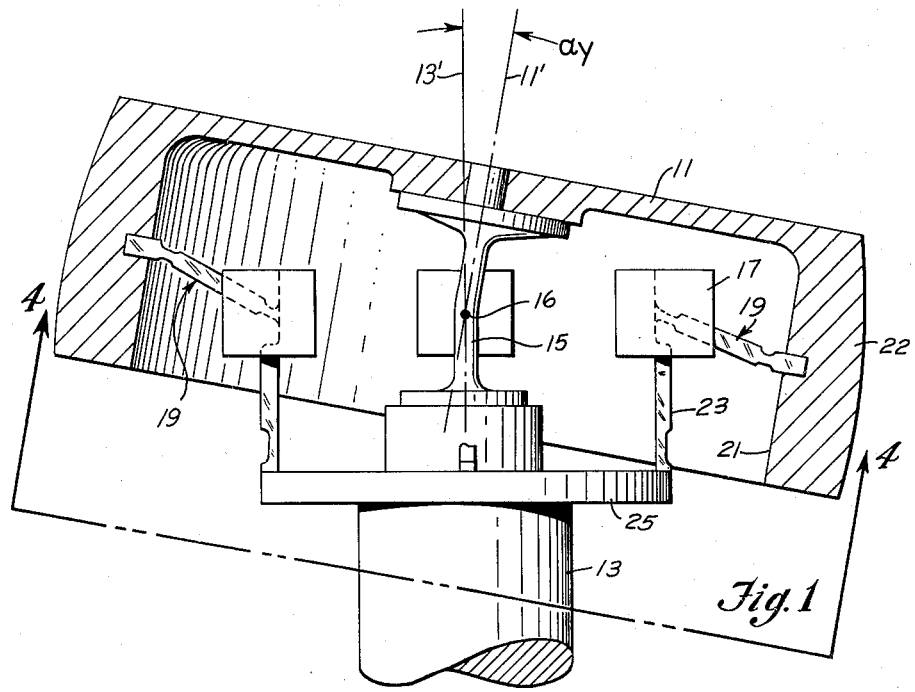
FIG. 1 illustrates a view of the system of the invention in partial vertical section.

As shown in the drawings, the gyroscopic instrument comprises a wheel 11 which is coaxially connected to a shaft 13 by means of a flexible stem 15. When stem 15 is unflexed, the axis 11' of wheel 11 is co-linear with the axis 13' of shaft 13. Means such as a motor (not shown), the shaft of which is attached to the shaft 13, are provided to rotate the assembly of the shaft 13 and the wheel 11 at a high constant speed. The stem 15 enables the wheel 11 to pivot universally with respect to the shaft 13 about a pivot point 16. When the plane of rotation of wheel 11 is tilted or deflected so that axis 11' is not colinear with the axis 13', the stem 15 applies a restoring force to the wheel urging it back toward the untilted position. This restoring force must be compensated for. To provide this compensation according to the present invention, a plurality of blocks 17 are spaced angularly at equal intervals about the axis of the shaft 13 in a plane containing the pivot point 16. In the preferred embodiment there are four blocks 17 as shown in FIG. 4, and for good stability there should be at least three blocks. The blocks 17 are spaced at equal radial distances from the axis of the shaft 13 and are supported by radially extending support arms 19, which are connected between the blocks 17 and the inner wall 21 of the downwardly extending rim 22 of the wheel 11, and by support columns 23, which extend parallel to the axis of the shaft 13 and which are connected between the blocks 17 and a disc 25 fixed to the shaft 13 coaxially therewith. The blocks 17 will rotate with the shaft 13 and the wheel 11, and a centrifugal force will be generated in each block 17.

A component of the centrifugal force generated in each block 17 will be directed outwardly along the respective arm 19 connected to the block and applied to the wheel 11. When the wheel is in its normal or untilted position, the respective longitudinal axes of all arms 19 lie in a common plane through point 16 and perpendicular to axis 13' of shaft 13. Consequently, the components of centrifugal force transmitted by arms 19 do not tend to cause a change of plane in wheel 11. However, when the wheel 11 is deflected, as shown in FIG. 1, from its normal position, the arms 19 will no longer remain positioned along radii extending from the pivot point 16. Therefore the forces applied to the wheel 11 along the arms 19 will have a moment about the pivot point 16 and will apply a torque to the wheel 11 tending to pivot it about the pivot point 16. These forces apply torques to the wheel 11 which are cumulative and tend to pivot the wheel 11 further in the direction in which it is deflected from its normal position. Thus the total torque applied to the wheel 11 resulting from the centrifugal forces generated in the blocks 17 acts in opposition to the torque applied to the wheel 11 by the stem 15.

Figure 2:
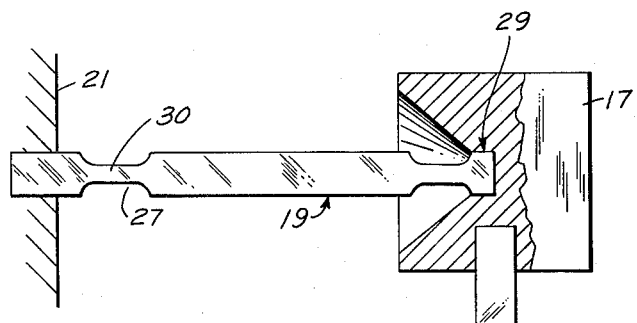
FIG. 2 illustrates the details of how the support arms interconnect the blocks to the wheel and to the disc fixed to the shaft.

As best illustrated in FIGS. 2 and 3, the arms 19 comprise metal bars which are substantially wider than they are thick to provide a rectangular cross section. In one specific embodiment of the invention these bars are .075 inch wide and 0.030 inch thick. The support arms 19 are each provided at both ends with opposing transverse grooves 27 forming therebetween reduced cross-sectional segments or necks 30. One end of each of the arms 19 is fixed rigidly to the inner wall 21 of the rim 22 and the other end of each of the arms 19 is fixed rigidly to one of the blocks 17 in a cylindrical socket adjacent which is formed a sloping clearance area, to allow for angular displacement of the arm 19, as is best illustrated in FIG. 2. When the wheel 11 deflects from its normal position, the arms 19 flex at the necks 30; the necks provide flexible joints in the arm 19.

The columns 23 are rigidly connected to the blocks 17 at one end and rigidly connected to the disc 25 at the other end. Each of the columns 23 is provided on its radially outer edge with a transverse groove 31 forming a reduced cross-sectional segment or neck 32 adjacent the end connected to the disc 25. Necks 32 provide flexible joints in the columns 23. When the wheel 11 is deflected from its normal position, the distance between the blocks 17 and the wall 21 is diminished and the blocks 17 can move radially outward because the arms 19 are no longer co-linear with radii extending from the pivot point 16. This radial outward movement is caused by centrifugal force and accommodated by the flexure of the columns 23 at the necks 32. The arms 19 and the columns 23 are made to have as high bending compliance as possible in the necks 30 and 32 respectively.

The torque resulting from any given block 17 will depend on its angular position relative to the plane of the tilt or deflection angle $\alpha_y$ and will vary with the rotation of wheel 11, reaching a maximum when the block is directly in said plane and becoming zero when the block is at a 90° angle to said plane. Nevertheless the summation of the torques resulting from all the blocks 17 remains constant for all angular positions because of their uniform angular distribution about the pivot point 16.

The only torque on the wheel 11 resulting from the blocks 17 combined will be about the pivot point 16 in the direction in which the wheel is deflected. The centrifugal forces generated by the masses of the arms 19 will add to the torque applied to the wheel 11 by the blocks 17. The forces resulting from the resistance of the flexible joints of the arms 19 to being bent when the wheel is deflected will subtract from the torque applied by the blocks 17. The centrifugal forces generated by the columns 23 have very little effect and can be neglected. Similarly the columns 23 only flex a small amount in the necks 32 and therefore the resistance of these columns to being bent can be neglected. Thus there are three types of torques introduced by the blocks 17 and the support arms 19 that should be considered: (a) major inertial torques which are supplied by the centrifugal force of the blocks 17, (b) minor inertial torques provided by the inertia of the radial support arms, and (c) static torques due to the bending of the support arms about their flexible joints. The total torque equation taking into account these three components is:

$$T = 2M\omega^2 \frac{a}{c}(a-c)^2 \sin \alpha_y + 2I_1 \frac{a}{c} \omega^2 \sin \alpha_y - \frac{EI_2(3a-c)}{1c} \frac{a}{c} \sin \alpha_y$$

In this formula M is the mass of the blocks 17, $\omega$ is the speed of rotation of the unit; $a$ is the radius of the inner wall 21 of the rim of the wheel 11; $c$ is the length of the support arms 19; $\alpha_y$ is the angle of deflection, previously defined; $I_1$ is the mass moment of inertia of the support arms 19; $I_2$ is the area moment of inertia of the flexible joints of the support arms 19; E is the elastic modulus of the material of the arms 19; and 1 is the width of the grooves 27. From this formula it will be apparent that the total torque resulting from the blocks 17 and support arms 19 is linear with deflection through small angles of deflection.

There are five possible types of errors in the system. The centers of gravity of the inertial blocks 17 can be axially displaced resulting in a torque rotating with the wheel causing the wheel to run cocked. An axial displacement between any opposing inertial blocks of 0.001 inch will produce no more than one second of wheel pitch. The support arms 19 may not lie precisely along radii from the pivot point 16 when the wheel 11 is in its normal position, resulting in a rotating torque causing the wheel to cock. If the support arms are misaligned to the extent amounting to 0.001 inch axial displacement at their ends, a wheel pitch of no more than two seconds will result. If the centers of gravity of the blocks 17 are at unequal radii, there will be radial unbalance. Likewise, if the masses of the blocks are unequal, radial unbalance will result. Both of these errors resulting in radial unbalance can be adjusted when the system is balanced. All of the masses of the inertial blocks 17 can be equally over or under-weight or placed equally at a wrong radius. The effect of both of these errors will be over or undercompensation and no unbalance will result. If all of the radii are too large by 0.001 inch, the decrease in compensation would amount to 0.15 gram centimeters per minute. If all of the masses of the blocks 17 were correct to the nearest .010 gram, the compensation would be correct to the nearest .125 gram centimeters per minute.

Errors due to axial displacement of the centers of gravity of the blocks 17 or the arms 19 not lying along radii extending from the pivot point 16 can be made correctible by making the connection of the columns 23 to the disc 25 so that the columns 23 are axially adjustable with respect to the disc 25, although no adjustment will be necessary within moderate tolerances. Errors in masses of the blocks 17 or the radial position of the blocks 17 can be made correctible by providing a small screw in each block directed radially.

Many modifications may be made to the above described specific embodiment of the invention without departing from the spirit and scope thereof.

What is claimed is:

1. A gyroscopic device comprising a wheel, a shaft, means flexibly connecting said shaft coaxially with said wheel so that said wheel is pivotable with respect to said shaft, a plurality of masses uniformly distributed around said shaft, means mounting said masses on said shaft permitting radial movement thereof with respect to said shaft, and means flexibly connecting said masses to said wheel.

2. A gyroscopic device, comprising:
   a rotatable shaft;
   a wheel;
   means coaxially connecting said wheel to said shaft for conjoint rotation therewith in a plane normally perpendicular to the rotational axis of the shaft, said means enabling deflection of the plane of rotation of the wheel while exerting a restoring force thereon;
   a plurality of substantially equal masses;
   means mounting said masses on said shaft for conjoint rotation therewith about the shaft axis and for radial displacement relative thereto, said masses being equiangularly distributed about the shaft axis at substantially equal radial distances therefrom, and
   individual radial force-transmitting means connecting each of said masses to said wheel at respective equiangularly spaced points the locus of which is a circle concentric with the wheel.

3. A gyroscopic device according to claim 2 wherein said mounting means are columns normally parallel to, and having relatively high flexural compliance in planes containing, said shaft axis and relatively low compliance in all other directions and modes.

4. A gyroscopic device according to claim 2 wherein said force-transmitting means are radial arms having relatively high flexural compliance in planes containing said shaft axis and relatively low compliance in all other directions and modes.

5. A gyroscopic device, comprising:
   a rotatable shaft;

a wheel;

means coaxially connecting said wheel to said shaft for conjoint rotation therewith in a plane normally perpendicular to the rotational axis of the shaft, said means enabling deflection of the plane of rotation of the wheel while exerting a restoring force thereon;

a plurality of substantially equal masses;

means mounting said masses on said shaft for conjoint rotation therewith about the shaft axis and for radial displacement relative thereto, said masses being equiangularly distributed about the shaft axis with their centers of mass at substantially equal radial distances therefrom and in a plane normal thereto; and individual radial force-transmitting means connecting each of said masses to said wheel at respective equiangularly spaced points the locus of which is a circle concentric with the wheel.

6. A gyroscopic device, comprising:

a rotatable shaft;

a wheel;

means coaxially connecting said wheel to said shaft for conjoint rotation therewith in a plane normally perpendicular to the rotational axis of the shaft, said means being a flexible, resilient stem of small diameter as compared to the shaft and enabling deflection of the plane of rotation of the wheel about a pivot point on said shaft axis while exerting a restoring force thereon;

a plurality of substantially equal masses;

means mounting said masses on said shaft for conjoint rotation therewith about the shaft axis and for radial displacement relative thereto, said masses being equiangularly distributed about the shaft axis with their centers of mass at substantially equal radial distances therefrom and in a plane through said pivot point and normal to said shaft axis; and individual radial force-transmitting means connecting each of said masses to said wheel at respective equiangularly spaced points the locus of which is a circle concentric with the wheel.

7. A gyroscopic device, comprising:

a rotatable shaft;

a discoid mass;

a flexible, resilient, cylindrical stem of smaller diameter than said shaft, extending coaxially from one end thereof and coaxially coupling said discoid mass to the shaft for conjoint rotation therewith in a plane normally perpendicular to the rotational axis of the shaft, whereby the rotational plane of the discoid mass is deflectable about a pivot point on said shaft axis;

a plurality of substantially equal masses;

a supporting column for each of said equal masses disposed substantially parallel to the shaft axis, one end of each of said columns being fixedly secured to a respective one of said masses, the respective other ends of said columns being connected to said shaft at fixed points equiangularly distributed about the shaft axis at a uniform radial distance therefrom and in a plane substantially normal thereto, said columns having relatively high flexural compliance in planes containing the shaft axis and relatively low compliance in all other directions and modes; and individual radial force-transmitting means connecting each of said masses to said wheel at respective equiangularly spaced points the locus of which is a circle concentric with the wheel.

8. A gyroscopic device, comprising:

a rotatable shaft;

a discoid mass;

a flexible, resilient, cylindrical stem of smaller diameter than said shaft, extending coaxially from one end thereof and coaxially coupling said discoid mass to the shaft for conjoint rotation therewith in a plane normally perpendicular to the rotational axis of the shaft, whereby the rotational plane of the discoid mass is deflectable about a pivot point on said shaft axis;

a plurality of substantially equal masses;

means mounting said masses on said shaft for conjoint rotation therewith about the shaft axis and for radial displacement relative thereto, said masses being equiangularly distributed about the shaft axis with their centers of mass at substantially equal radial distances therefrom and in a plane through said pivot point and normal to said shaft axis; and a force-transmitting arm extending radially outwardly from each of said equal masses, each of said arms having its inner end fixedly secured to a respective one of said masses, the respective outer ends of said arms being fixedly secured to said discoid mass at equiangularly-spaced points the locus of which is a circle concentric with the discoid mass, said arms having relatively high flexural compliance in planes containing the shaft axis and relatively low compliance in all other directions and modes.

9. A gyroscopic device, comprising:

a rotatable shaft;

a discoid mass;

a flexible, resilient, cylindrical stem of smaller diameter than said shaft, extending coaxially from one end thereof and coaxially coupling said discoid mass to the shaft for conjoint rotation therewith in a plane normally perpendicular to the rotational axis of the shaft, whereby the rotational plane of the discoid mass is deflectable about a pivot point on said shaft axis;

a plurality of substantially equal masses;

a supporting column for each of said equal masses disposed substantially parallel to the shaft axis, one end of each of said columns being fixedly secured to a respective one of said masses, the respective other ends of said columns being connected to said shaft at fixed points equiangularly distributed about the shaft axis at a uniform radial distance therefrom and in a plane substantially normal thereto, said columns having relatively high flexural compliance in planes containing the shaft axis and relatively low compliance in all other directions and modes; and a force-transmitting arm extending radially outwardly from each of said equal masses, each of said arms having its inner end fixedly secured to a respective one of said masses, the respective outer ends of said arms being fixedly secured to said discoid mass at equiangularly-spaced points the locus of which is a circle concentric with said discoid mass, said arms lying in a plane through said pivot point and intersecting respective longitudinal axes of said columns at right angles when said plane of rotation is perpendicular to the shaft axis, said arms having relatively high flexural compliance in planes containing the shaft axis and relatively low compliance in all other directions and modes.

References Cited by the Examiner

UNITED STATES PATENTS

| | | | |
|---|---|---|---|
| 1,890,831 | 12/32 | Smyth | 74—5 X |
| 2,452,335 | 10/48 | Stoner | 74—5 X |
| 2,995,938 | 8/61 | Brodersen | 74—5.7 |
| 3,077,785 | 2/63 | Stiles | 74—5 |

BROUGHTON G. DURHAM, *Primary Examiner.*